Aug. 26, 1952 — S. F. VARIAN — 2,608,529
METHOD OF UNITING PARTS BY ELECTRODEPOSITION
Filed Dec. 29, 1945
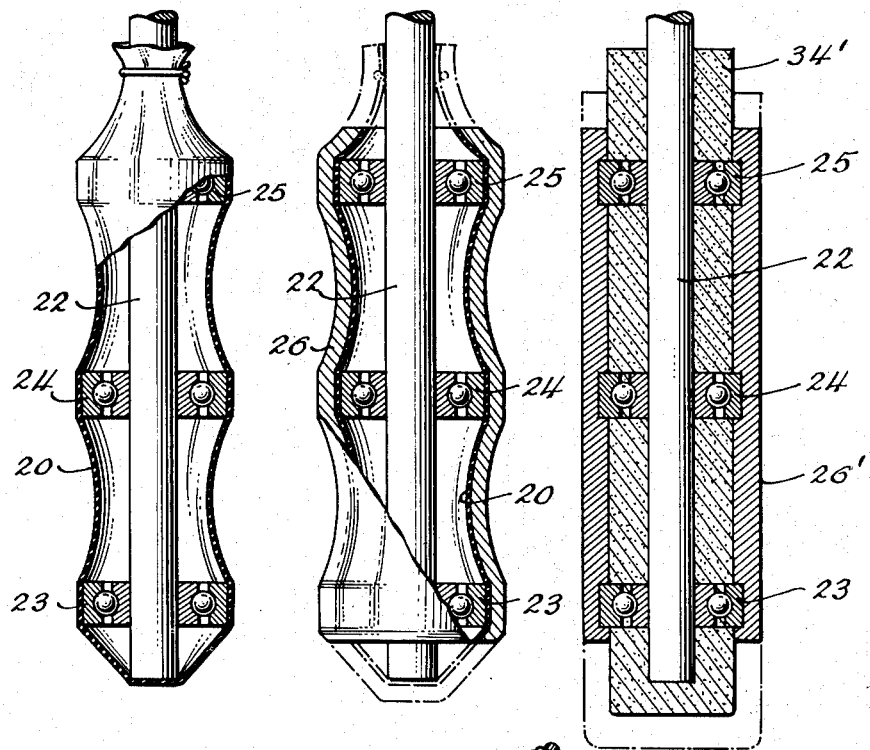
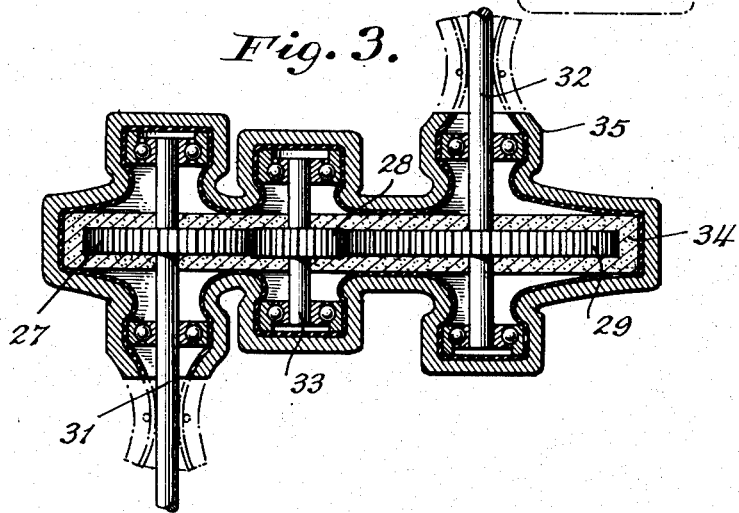
INVENTOR
SIGURD F. VARIAN
BY
his ATTORNEY Patented Aug. 26, 1952

2,608,529

UNITED STATES PATENT OFFICE 2,608,529

METHOD OF UNITING PARTS BY ELECTRODEPOSITION

Sigurd F. Varian, Garden City, N. Y., assignor to The Sperry Corporation, a corporation of Delaware Application December 29, 1945, Serial No. 638,093

3 Claims. (Cl. 204—16)

The present invention relates to the construction of assemblies or subassemblies of mechanical elements, and is particularly concerned with the construction of such assemblies or subassemblies in accurately fitting rigid supporting structures.

In the manufacture of mechanical systems including shafts, bearings, trains of gears, and other well-known mechanical elements, it is often difficult to align the bearings and other elements in such a way as to avoid excessive strains and vibrations, and to insure the best performance of the mechanical elements. For example, in miniature high-speed machine tools such as small drills and grinding machines, it is sometimes necessary to support a relatively long, slender shaft by means of a plurality of bearings. If two bearings are sufficient for this purpose, the problem of alignment is relatively simple, but it usually is found that at high speeds a relatively long shaft supported by only two bearings has a tendency to "whip," causing excessive bearing wear and inaccuracy of the machine tool. A third bearing at an intermediate point on the shaft may be employed to overcome the "whip," but the provision of a third bearing greatly complicates the problem of mounting the bearing elements in correct alignment. In the past, tubular housing have been constructed for supporting two or more bearing elements, and have been provided with adjustable devices by which the relative positions of the bearings may be manually varied. Such adjustable bearing arrangements are not entirely satisfactory.

A somewhat similar problem arises in the manufacture of a subassembly of machine elements including a train of gears. For optimum operation with minimum wear of the gears, it is necessary not only that the shafts of a train of spur gears, for example, be arranged in mutually parallel alignment, but also that the spacings of their axes be fixed according to the dimensions of the gears employed. Where extreme accuracy is required, it is necessary that minor non-uniformities of the gears be taken into account, so that the spacing between corresponding shafts of generally similar gear train subassemblies are varied according to the dimenions of the individual gears employed.

An object of the present invention is to provide an assembly of mechanical elements in a unitary, rigid casing ideally fitted to the elements for insuring the best operative relations thereamong, the casing being free from internal strains, and being shaped solely in conformity to the mechanical elements without limitation to a shape which would admit of insertion and asembly of the elements therein after formation.

Another object of the present invention is to provide an improved process of construction of arrangeemnts of mechanical elements, and particularly to provide a rigid casing conformally suporting a plurality of elements in a desired positional relation.

A further object is to provide a process of construction of arrangements of mechanical elements whereby mass production of generally similar arrangements may be accomplished rapidly and economically with such variations of the spacings and configurations of said elements as are required to accommodate minute non-uniformities of the dimensions of the elements.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In accordance with a major feature of the present invention, there is provided a process of construction of a mechanical arrangement of elements wherein the elements themselves, arranged in their operative relation, determine the dimensions and configuration of the supporting structure. The elements are first aligned in an ideal operating relation, and a mandrel is built about them. A suitable construction material is then deposited upon the surface of the mandrel, in such a way as to build thereon a strain-free rigid housing or casing for the elements. This casing is so formed as to hold the elements rigidly in the predetermined alignment, and thus to insure a long life of trouble-free operation of the mechanical system. The above objects and brief description of the present invention will be understood more clearly, and other objects will become apparent from the following detailed description of the present invention, considered in relation to the drawings, wherein Fig. 1 shows a mechanical subassembly of elements sheathed in a flexible skin preparatory to the deposition of a rigid casing material thereon;

Fig. 2 shows the apparatus of Fig. 1 after the casing has been built thereon;

Fig. 3 illustrates an application of the present invention to a gear train, and

Fig. 4 illustrates a modification of the present invention wherein the rigid casing material is applied directly to the outer surfaces of some of the mechanical elements, and to the outer surface of a temporary rigid filler.

In Fig. 1 is shown a portion of a shaft 22 and a plurality of bearings 23, 24, and 25. Bearings 23, 24 and 25 are selected for freedom from eccentricity and from divergence of the axes of the inner and outer bearing races. The inner races are positioned on shaft 22 at the desired axial spacings and a mandrel for deposition of a casing is provided by drawing a flexible skin or resilient envelope 20 over the outer races of the bearings 23, 24 and 25. This outer skin or envelope may comprise a thin rubber tube, of "neoprene" or "Duprene", or, other synthetic rubber may be employed. Also, the flexible, resilient rubber-like envelope 20 may be distended at the surfaces of contact with the outer bearing races of the bearings 23, 24 and 25 either by the elastance of the envelope itself or by withdrawing air from within the envelope. In either case the envelope 20 provides a base for the rigid envelope-embracing sheath 26 the contour of which is determined by the general shape of the assembled elements. After the flexible tube 20 has been drawn or slid over the bearings and fixed in place as desired, a thin metallic layer is deposited thereon to provide a basis for electroplating. This step may be carried out by the "Metaplast" process, by which a very thin electrically conductive layer of silver is made to adhere to the skin 20.

A reasonably thick, rigid wall 26 is then formed about envelope 20 as, for example, by electroplating. This wall may be made of copper or other selected metal, built up to such a thickness that adequate mechanical strength is attained. Rapid electro-deposition of metals is now inexpensive, and is in general use. By rapid agitation of an electrolyte, it is possible to achieve electro-deposition of nickel, for example, at a rate as high as 0.004 inch per minute.

The structure as developed by this process is illustrated in cross-section in Fig. 2. The finished subassembly including the shaft 22 and the bearings 23, 24 and 25 supported within the rigid metal outer sheath 26 may be mounted in any desired manner, as by using a clamp mounting ring surrounding the casing 26, or by grinding flat areas on the surface of the casing and drilling and tapping for the reception of mounting screws.

It will be readily apparent that the critical dimensions of the casing 26 are so fixed as to provide ideal alignment of the bearing elements. The thin elastic skin 20 between the inner surface of the casing 26 and the surfaces of the outer races of the bearings protects the bearings from contact with corroding electrolyte during the development of the outer casing 26, and thereafter provides a desirable elastance of support for the bearings. If desired, this skin may be so deformed before application of the metallic coating as to pre-load the mechanical system with such axial or radial forces as may be desired. While ball bearings are shown by way of illustration, other types of bearings, such as sleeve bearings or roller bearings, may be used.

In Fig. 3 there is shown a gear train including consecutive spur gears 27, 28 and 29. Gear 28 may be employed as an idler, coupling a driven gear 27 to an output gear 29. Gears 27 and 29 may be mounted upon and keyed to input and output shafts 31 and 32, respectively. These shafts, and a further shaft 33 supporting the idler gear 28, are each mounted in two or more bearings. Gears 27, 28 and 29 and their associated shafts and bearings may be arranged as by means of an adjustable jig in such a way as to provide an ideal meshing relation of the gear teeth. A wax body 34 may then be formed about gears 27, 28 and 29 to retain these elements in the desired alignment when they are removed from the jig. A flexible sleeve or skin is then stretched over the gear train assembly, and a casing 35 is formed thereover by first depositing a thin layer of a conductive metal, and then employing electro-deposition as with an agitated-electrolyte plating bath.

Thereafter, the wax body 34 may be removed as by heating the system, leaving the gears accurately placed in an ideal mutual spacing arrangement. It will be seen that except for the building of the temporary body 34, and the removal thereof following the formation of the rigid casing 35, the process of construction of the subassembly in Fig. 3 corresponds closely to that described in connection with Figs. 1 and 2, with corresponding advantages provided by the flexible, resilient skin which separates the bearing races from contact with the rigid housing.

It will be noted that the unitary housing or casing 35 lends itself to applications requiring sealed-in mechanism e. g., for protection against dust or moisture. An extensive machine system may be made by interconnecting a group of unitarily cased subassemblies of the type shown in Fig. 3.

In some applications, it may be desirable that the mechanical elements be mounted in direct contact with the casing provided thereabout. Also, it may be desired that the inner surface configuration of the casing intermediate points of contact with the mechanical elements be rigidly fixed according to a predetermined pattern. For such a purpose, the flexible skin may be dispensed with, by building a mandrel including the contact surfaces of the mechanical elements, with a filler of wax or other temporary filler material applied between the bearings. With this arrangement, a thin metal coating may be applied by the "Metaplast" process directly upon the wax or other filler surfaces, and the mandrel may thereafter be plated with a desired casing material. The casing is then bonded to the outer surfaces of the bearings or other mechanical elements, and the wax or other filler material may thereafter be melted or dissolved and removed.

In Fig. 4 is shown a structure including a body 34' of filler material surrounding a shaft 22 and filling the spaces about bearings 23, 24 and 25, the metal casing 26' having been formed directly upon the outer races of the bearing and upon the "Metaplast" processed outer surface of the wax or other filler material.

In a modification of the present invention, the rigid casing may be formed by applying a thermoplastic coating upon the mandrel.

The present invention lends itself to an extremely wide degree of flexibility in the ultimate form of the mechanical supporting casing while insuring that the elements will be properly aligned in all instances. For example, it is obvious that the thickness of the rigid casing may be readily varied, by controlling the rate or duration of the electroplating or other material-depositing process. Also, the inner surface configuration of the structure may be varied according to the shape of the mandrel, as desired, by controlling the gas pressure within the flexible skin, or by varying the extent to which the skin is stretched over the mechanical elements, or by suitably forming the outer surface of the wax or other filler material employed in the formation of the mandrel.

By the process of the present invention, there is provided a unitary casing precisely conforming to the particular elements supported thereby. As this casing is formed upon a mandrel which includes these elements in their operative positions, without resort to excessive temperatures, it is free of internal stresses, and thus permanence of form and freedom from strain cracks is assured. Moreover, a compact, unitary casing may be built upon a complex arrangement of elements which could not be assembled in a cast housing of similar compactness.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method of forming a unitary structure composed of an assembly of mechanical parts which comprises the steps of assembling a plurality of parts in desired relative relationship, enclosing the assembly in a thin, rubber-like envelope conforming generally with the contour of the parts of said assembly, decreasing the gas pressure within said envelope to thereby cause said envelope to be distended over the surfaces of engagement of the parts of said assembly, applying to said envelope a relatively thin deposit of electrically conductive material, and thereafter building upon said deposit a substantially rigid sheath by electroplating.

2. The method of forming a unitary housing structure composed of an assembly of mechanical elements including relatively movable, coacting parts which comprises the steps of assembling said elements and movable parts in normal operative position, embedding the relatively movable, coacting parts wholly within a body of reducible material capable of being rendered fluent so as to be later removed, enclosing the resultant assembly in a thin, rubber-like envelope conforming generally with the contour of the resultant assembly, decreasing the gas pressure within said envelope to thereby cause said envelope to be distended at the surfaces thereof which engage said resultant assembly, applying to said envelope a relatively thin deposit of electrically conductive material, building up upon said thin deposit a relatively thick layer of rigid material by electroplating, and thereafter rendering said reducible material fluid and removing the same.

3. The method of forming a unitary structure composed of an assembly of mechanical parts which comprises the steps of assembly a plurality of parts in desired relative relationship, wholly enclosing the assembly by sliding over the parts of said assembly a flexible envelope open at one end and closed at the other so that said envelope fits closely and in engagement with surfaces thereof, closing the open end of said envelope to thereby prevent ingress of matter to the interior of said envelope, applying to said flexible envelope a relatively thin deposit of electrically conductive material, and thereafter building upon said envelope a substantially rigid sheath by electroplating.

SIGURD F. VARIAN.

REFERENCES CITED

The following references are of record in the file of this patent:

UNITED STATES PATENTS

| Number | Name | Date |
|---|---|---|
| 277,248 | Edgerton | May 8, 1883 |
| 281,223 | Rogers | July 10, 1883 |
| 574,843 | Winslow | Jan. 5, 1897 |
| 859,813 | Hartmann | July 9, 1907 |
| 901,115 | Metten | Oct. 13, 1908 |
| 1,182,271 | Hersh | May 9, 1916 |
| 1,454,425 | Chapman | May 8, 1923 |
| 1,674,941 | Bart | June 26, 1928 |
| 1,800,360 | Schroeder | Apr. 14, 1931 |
| 1,905,583 | Giesler | Apr. 25, 1933 |
| 1,914,918 | Heermans | June 20, 1933 |
| 1,922,431 | Geyer | Aug. 15, 1933 |
| 1,983,713 | Stearns et al. | Dec. 11, 1934 |
| 1,989,996 | Mantsch | Feb. 5, 1935 |
| 2,018,353 | Gothe | Oct. 22, 1935 |
| 2,092,291 | Olsen | Sept. 7, 1937 |
| 2,119,056 | Peterson | May 31, 1938 |
| 2,201,477 | Chamberlin | May 21, 1940 |
| 2,293,313 | Sladky | Aug. 18, 1942 |
| 2,327,762 | Bull | Aug. 24, 1943 |
| 2,517,902 | Luebkeman | Aug. 8, 1950 |

FOREIGN PATENTS

| Number | Country | Date |
|---|---|---|
| 95,761 | Germany | Jan. 19, 1898 |
| 325,019 | Germany | Apr. 17, 1919 |